3,682,834
REDUCING THE RESIDUE CAUSED BY THE VAPORIZATION OF CHLORINATED SOLVENT TO DRYNESS
Thomas A. Vivian, Midland, Mich., assignor to The Dow Chemical Company, Midland, Mich.
No Drawing. Filed Oct. 23, 1970, Ser. No. 83,654
Int. Cl. B01f 1/00
U.S. Cl. 252—364                    3 Claims

ABSTRACT OF THE DISCLOSURE

By addition of a small but effective amount of dimethoxymethane to a chlorinated solvent containing by volume a major portion of methylene chloride, a minor proportion of perchloroethylene, trichloroethylene or mixture thereof and a minor proportion of other organic solvents, the residue left upon the vaporization of the solvent to dryness is reduced.

BACKGROUND OF THE INVENTION

There are numerous applications in which a chlorinated solvent is vaporized to dryness. In particular, solvents containing methylene chloride and perchloroethylene or/and trichloroethylene are vaporized to give vapor mixtures which may be utilized in the reflow of thermoplastic organic surfaces. In vapor reflow, the solvent is completely vaporized and contacted with the organic surface. The organic surface is quickly mobilized and dried to form a smooth surface with original imperfections removed.

The solvents for vapor reflow may contain in addition to methylene chloride and perchloroethylene or trichloroethylene a minor amount of other organic solvents, such as glycol mono and diethers, glycol mono and diesters, glycol ether esters, alcohols, ketones, toluene, benzene, esters and ethers. Such components are generally less than about 25% by volume of the solvent.

These clorinated solvents in the process of vaporization leave a residue. As could be expected, this residue is highly undesirable in many vaporizations. This concern has its genesis from two main problems associated with such vaporizations. The first and most importatn in vapor reflow applications is the problem caused when the solvent is vaporized to dryness in a small chamber. The residue left upon vaporization tends to fill the chamber and constrict or terminate the flow of solvent through the chamber. The second major problem associated with the residue upon vaporization of the solvent involves the reduction in the capacity of the heat transfer surface. The residue is deposited on the heat transfer surface and accumulates to reduce the efficiency of the vaporization. Thus, increasing amouns of energy are required until the vaporization is inhibited to such an extent that it is no longer economically feasible.

The workable solutions to this problem of residue formation have been economically unacceptable. Either the vaporization apparatus has been discarded or the vaporization apparatus has been discarded or the vaporization chambers have been manually cleaned by scraping the residue from the walls. Of course, the first method of coping with this problem is carried out at large expense and therefore can be used only with cheap apparatus or for projects which have a high economic return. The second method of manual cleaning, however, is a plausible alternative only for certain vaporization chambers which are readily accessible and which have surfaces that can be cleaned. On balance, neither of these methods of dealing with the vaporization residue is desirable.

SUMMARY OF THE INVENTION

It has now been found according to the present invention that the residue formed upon the vaporization to dryness of a solvent containing by volume a major amount of methylene chloride, a minor amount of perchloroethylene, trichloroethylene or mixture thereof and a minor amount of other organic solvents is reduced by the addition of a small but effective amount of dimethoxymethane. By the addition of dimethoxymethane to the solvent, the problems associated with the vaporization of such solvents are substantially reduced or eliminated without the necessity of disposing the vaporizer or without manual cleaning.

The amount of dimethoxymethane added to the solvent may vary as different solvents are employed. An effective amount of the additive is that amount of additive which substantially reduces the residue formation when compared to the solvent without the additive. It has been discovered that the effective amount for most solvents of the invention is less than about 0.5% by volume of the methylene chloride in the solvent. It has also been discovered that in the addition of dimethoxymethane to the solvent, the residue is decreased to a minimum (usually when the solvent contains less than 0.5 volume percent dimethoxymethane), and upon the addition of more dimethoxymethane a solvent is obtained which again leaves an undesirable residue. Thus, care should be taken to prevent the addition of too much dimethoxymethane to the solvent.

The methods of incorporating the additive and utilization of the resulting solvent are all well known in the art. The important and novel feature of the invention is the addition of an effective amount of dimethoxymethane to reduce the residue formed upon evaporation of the solvent to dryness.

The resulting solvent may also be stabilized against deleterious reactions with other materials. For example, an alkylene oxide, dioxane or another known stabilizer may be added to the solvent to protect against degradation of the chlorinated hydrocarbon. Of special importance in the invention is the use of a small but effective amount of diisopropylamine in addition to the dimethoxymethane because of the very small residue left upon evaporation.

SPECIFIC EMBODIMENTS

Examples 1–5

One liter samples of a chlorinated solvent formulation containing by volume: 70% methylene chloride containing 0.5% propylene oxide; 20% uninhibited perchloroethylene; and 10% ethylene glycol ethyl ether acetate with and without additives were prepared. The samples were evaporated to a volume of 150 ml. in a 1500 ml. beaker using a hot plate having a temperature of 500° to 600° C. The 150 ml. of liquid from the evaporation was transferred to a Pyrex crystallizing dish and the sample was evaporated to dryness with the hot plate. Visual observations were made to determine the nature and extent of the residue. The formulations tested and observations of the results are shown in Table I.

TABLE I.—COMPARISON OF RESIDUE LEFT BY EVAPORATION OF CHLORINATED SOLVENTS

| Ex. | Additives, volume percent | Observation of residue |
|---|---|---|
| 1 | None | Black carbonaceous residue measuring approximately ⅜″ diameter. |
| 2 | 0.3 dimethoxymethane | Gray residue measuring about ³⁄₁₆″ in diameter. |
| 3 | 0.5 dimethoxymethane | Dark carbonaceous ring about 1 cm. wide having a diameter of about 1⅜″ and covering an area substantially less than that of of Example 1. |
| 4 | 2.5 dimethoxymethane, 0.5 propylene oxide. | Gray residue measuring about ½″ in diameter. |
| 5 | 0.3 dimethoxymethane, 0.5 diisopropylamine. | No measurable gray areas slightly better than Example 2. |

In the same manner as described above, the perchloroethylene may be totally or partially replaced by trichloroethylene to give a solvent which, upon evaporation to dryness, leaves a residue which is smaller than the solvents without dimethoxymethane. Also, in the same manner, the glycol ether ester may be totally or partially replaced with other organic solvents such as glycol mono and diethers, glycol mono and diesters, benzene, toluene, alcohols, ketones and the like, or mixtures thereof, to give a solvent with a reduced residue upon evaporation. In addition, methylene chloride without propylene oxide may be substituted for the methylene chloride of the examples, and the desirable reduction of the residue may still be realized.

I claim:

1. A composition of matter consisting essentially of a solvent containing by volume a major amount of methylene chloride, a minor amount of perchloroethylene, trichloroethylene or mixture thereof, a minor amount of at least one other organic solvent selected from the group consisting of alcohols, ketones, toluene, benzene, esters, ethers and mixtures thereof and a small but effective amount of dimethoxymethane to reduce the residue formed upon vaporization of the solvent to dryness.

2. The composition of claim 1 wherein the solvent contains less than about 0.5 percent dimethoxymethane.

3. The composition of claim 1 also containing a small but effective amount of diisopropylamine to stabilize the composition against deleterious reactions with other materials.

References Cited

UNITED STATES PATENTS

| | | | |
|---|---|---|---|
| 2,375,460 | 5/1945 | Barbre | 252—364 X |
| 3,031,410 | 4/1962 | Petering et al. | 252—171 |
| 3,281,480 | 10/1966 | Hardies | 252—171 X |

RICHARD D. LOVERING, Primary Examiner

U.S. Cl. X.R.

252—171; 260—652.5 R